United States Patent
Uchino et al.

(10) Patent No.: US 10,021,692 B2
(45) Date of Patent: Jul. 10, 2018

(54) MOBILE COMMUNICATION METHOD AND RADIO BASE STATION

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 134 days.

(21) Appl. No.: 15/023,897

(22) PCT Filed: Sep. 19, 2014

(86) PCT No.: PCT/JP2014/074807
§ 371 (c)(1),
(2) Date: Mar. 22, 2016

(87) PCT Pub. No.: WO2015/046038
PCT Pub. Date: Apr. 2, 2015

(65) Prior Publication Data
US 2016/0219594 A1     Jul. 28, 2016

(30) Foreign Application Priority Data
Sep. 24, 2013  (JP) ................. 2013-196711

(51) Int. Cl.
*H04W 72/04*   (2009.01)
*H04W 80/02*   (2009.01)
*H04W 76/00*   (2018.01)
*H04W 92/20*   (2009.01)

(52) U.S. Cl.
CPC ....... *H04W 72/0453* (2013.01); *H04W 76/00* (2013.01); *H04W 80/02* (2013.01); *H04W 92/20* (2013.01)

(58) Field of Classification Search
CPC .................. H04W 72/0453; H04W 76/00
See application file for complete search history.

(56) References Cited

U.S. PATENT DOCUMENTS

2014/0301188 A1* 10/2014 Koskinen ................ H04L 47/32
                                                                                  370/230
2017/0245252 A1*  8/2017 Gao ..................... H04W 72/042

OTHER PUBLICATIONS

3GPP TSG-RAN WG2#83 R2-132834, Aug. 19, 2013 (Aug. 19, 2013), XP050718551.*
(Continued)

*Primary Examiner* — Kevin C Harper
*Assistant Examiner* — Henry Baron
(74) *Attorney, Agent, or Firm* — Osha Liang LLP (57) ABSTRACT

In order to solve problems with "distributed RLCs" and "independent RLCs," a mobile communication method according to this embodiment includes: a step A of causing a radio base station eNB#1 to generate a PDCP-PDU addressed to a mobile station UE; a step B of causing the radio base station eNB#1 to associate the generated PDCP-PDU and an RLC-SN with each other and transmit the PDCP-PDU and the RLC-SN to a radio base station eNB#2; a step C of causing the radio base station eNB#2 to generate an RLC-PDU addressed to the mobile station UE by using the received PDCP-PDU and RLC-SN; and a step D of causing the radio base station eNB#2 to transmit the generated RLC-PDU to the mobile station UE.

15 Claims, 7 Drawing Sheets (56) References Cited

OTHER PUBLICATIONS

International Search Report issued in PCT/JP2014/074807 dated Dec. 16, 2014 (2 pages).
Written Opinion of the International Searching Authority issued in PCT/JP2014/074807 dated Dec. 16, 2014 (3 pages).
Huawie, HiSilicon; "Way Forward on the Selection of UP Architecture Alternatives"; 3GPP TSG-RAN WG2 Meeting #83, R2-132834; Barcelona, Spain; Aug. 19-23, 2013 (7 pages).
NSN et. al; "Comparison of the UP Alternatives"; 3GPP TSG-RAN WG2 Meeting #83, R2-132992; Barcelona, Spain; Aug. 19-23, 2013 (4 pages).
NTT DOCOMO, Inc.; "UP bearer split comparison (3C vs. 3D)"; 3GPP TSG-RAN WG2 #83bis, R2-133275; Ljubljana, Slovenia; Oct. 7-11, 2013 (8 pages).
Huawei, HiSilicon; "Throughput results for inter-frequency deployment of small cells"; 3GPP TSG-RAN WG2 Meeting #82, R2-131782; Fukuoka, Japan; May 20-24, 2013 (5 pages).
Extended European Search Report issued in the counterpart European Patent Application No. 14848544.4, dated Apr. 3, 2017 (6 pages).

* cited by examiner

MOBILE COMMUNICATION METHOD AND RADIO BASE STATION

TECHNICAL FIELD

The present invention relates to a mobile communication method and a radio base station.

BACKGROUND ART

Figure 4:
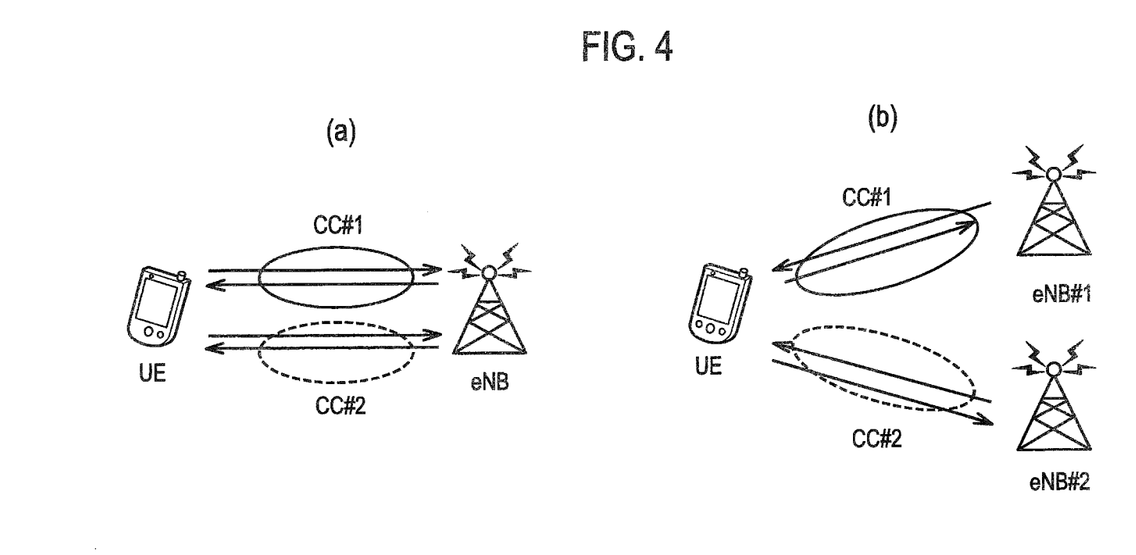
FIG. 4 is a set of diagrams for explaining carrier aggregation of conventional art.

In CA (Carrier Aggregation) specified up to LTE (Long Term Evolution) Release-10, as shown in Part (a) of FIG. 4, communications are performed simultaneously by using CC (Component Carrier) #1 and CC#2 under the same radio base station eNB to achieve high throughput.

Meanwhile, in LTE Release-12, "inter-eNB CA (or inter-node UP aggregation)" has been considered (see Non-patent document 1) in which CA up to LTE Release-10 is expanded such that, as shown in Part (b) of FIG. 4, communications are performed simultaneously by using CC#1 and CC#2 under different radio base stations eNB#1 and eNB#2 to achieve high throughput.

The "inter-eNB CA" needs to be performed to achieve a degree of throughput comparable to LTE Release-10 when, for example, all CCs used by one UE cannot be accommodated within one radio base station eNB.

Figure 5:
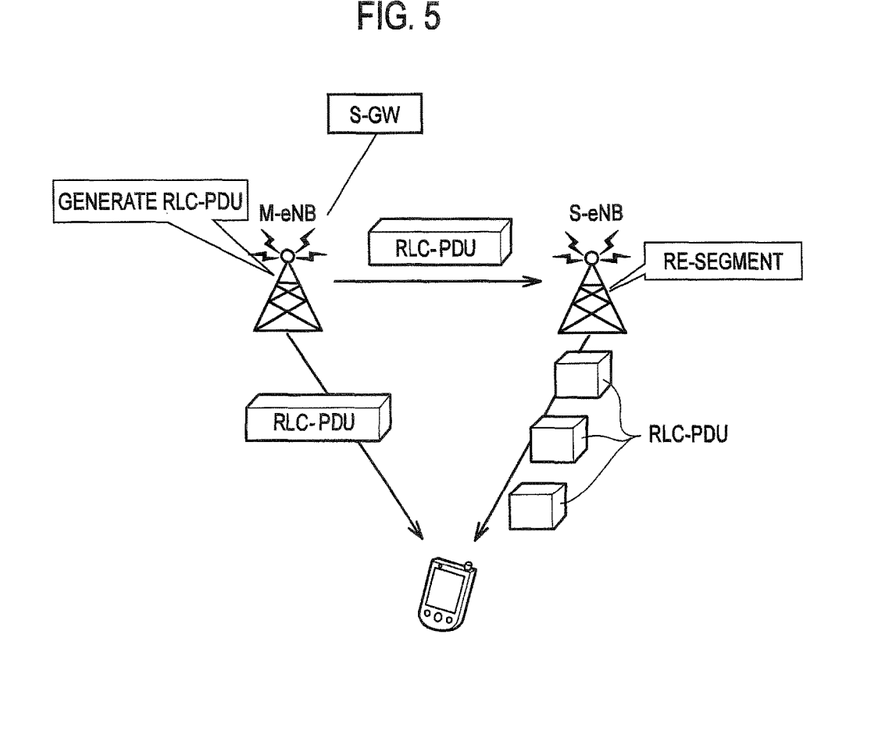
FIG. 5 is a diagram for explaining distributed RLCs of conventional art.
Figure 6:
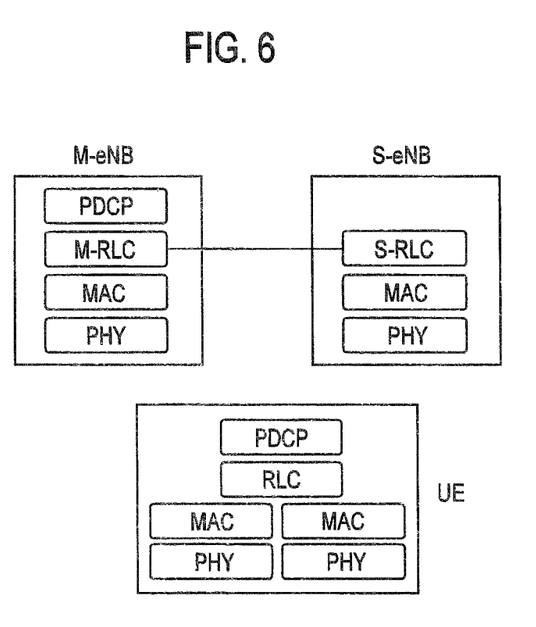
FIG. 6 is a diagram for explaining a protocol stack for the distributed RLCs of the conventional art.

Here, as shown in FIGS. 5 and 6, "distributed RLCs" has been proposed as a configuration to implement the "inter-eNB CA."

As shown in FIG. 5, in the "distributed RLCs," an M-RLC (Master-RLC) layer function of a master radio base station M-eNB is configured to generate an RLC-PDU (Radio Link Control-Protocol Data Unit) from a PDCP-PDU and forward the RLC-PDU to an S-RLC (Slave-RLC) layer function of a slave radio base station S-eNB. The S-RLC layer function of the slave radio base station S-eNB is configured to transmit the RLC-PDU to a mobile station UE.

Here, the S-RLC layer function of the slave radio base station S-eNB is configured to re-segment the received RLC-PDU when necessary.

Note that the re-segmentation is one of the RLC control processes specified in LTE Release-8, and is performed by an RLC layer function in retransmission of an RLC-PDU. Specifically, when a sufficient TBS (Transport Block Size) is not available for an RLC-PDU to be retransmitted, the RLC layer function further segments the RLC-PDU into RLC-PDU segments and transmits the RLC-PDU segments.

FIG. 6 shows a protocol stack for implementing the "distributed RLCs."

Figure 7:
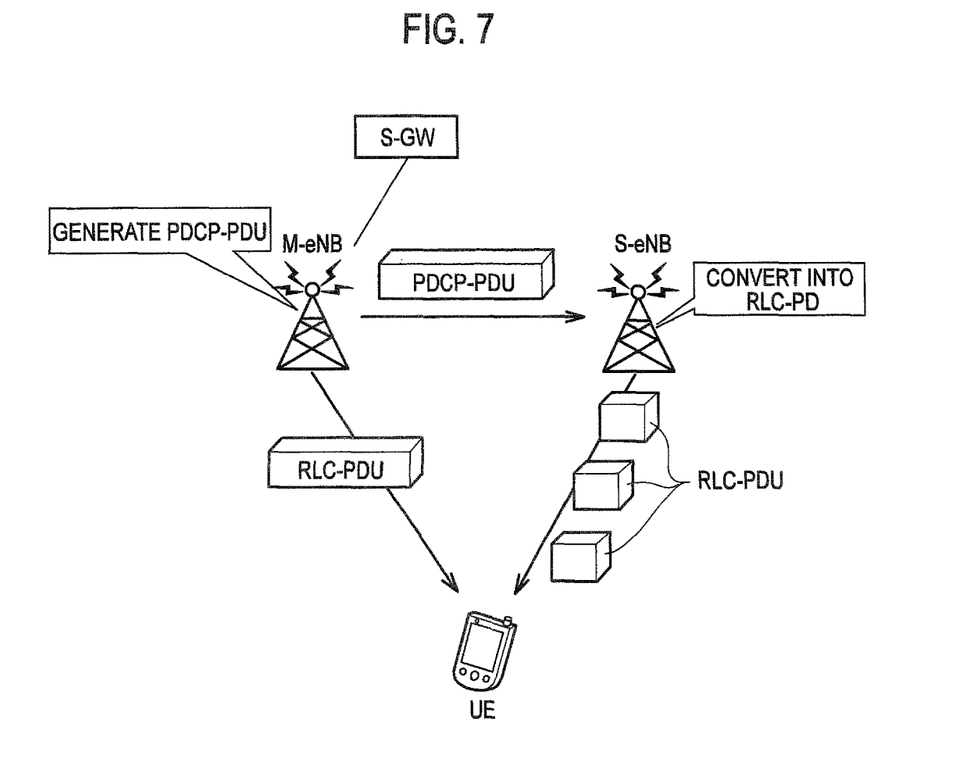
FIG. 7 is a diagram for explaining independent RLCs of conventional art.
Figure 8:
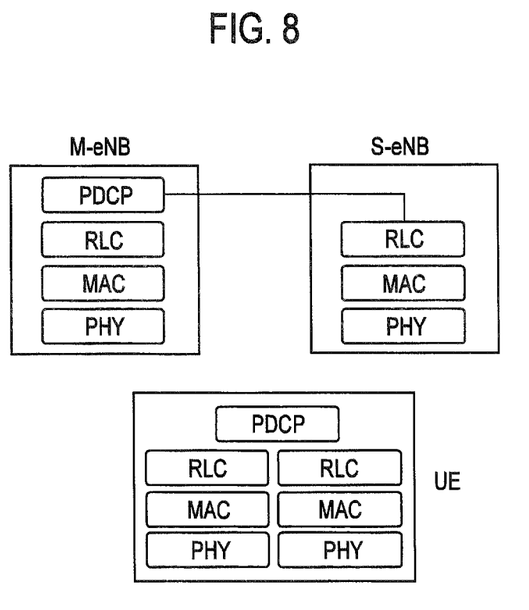
FIG. 8 is a diagram for explaining a protocol stack for the independent RLCs of the conventional art.

Also, as shown in FIGS. 7 and 8, "independent RLCs" has been proposed as a configuration to implement the "inter-eNB CA."

As shown in FIG. 7, in the "independent RLCs," a master radio base station M-eNB is configured to transmit a PDCP (Packet Data Convergence Protocol)-PDU to a slave radio base station S-eNB. An RLC layer function of the master radio base station M-eNB and an RLC layer function of the slave radio base station S-eNB are configured to independently generate RLC-PDUs and transmit them to a mobile station UE. FIG. 8 shows a protocol stack for implementing the "independent RLCs."

PRIOR ART DOCUMENT

Non-Patent Document

Non-patent document 1: 3GPP Contribution R2-131782

SUMMARY OF THE INVENTION

Here, in the "distributed RLCs," the master radio base station M-eNB must retain the PDCP-PDU, which is the base of the RLC-PDU, until the master radio base station M-eNB receives an Ack from each of the mobile station UE and the slave radio base station S-eNB. Hence, there has been a problem in that the master radio base station M-eNB requires a large volume of buffer.

On the other hand, in the "independent RLCs," the mobile station UE also needs to have a plurality of RLC layer functions for one EPS (Evolved Packet System) bearer. Hence, there has been a problem in that the impact of the change in function of the mobile station UE is large.

Thus, the present invention has been made in view of the above-mentioned problems, and an object thereof is to provide a mobile communication method and a radio base station capable of solving the problems with the "distributed RLCs" and the "independent RLCs."

A first feature of the present invention is summarized as a mobile communication method for a mobile station to perform carrier aggregation using a cell under a master radio base station and a cell under a slave radio base station, including: a step A of generating, by the master radio base station, a PDCP-PDU addressed to the mobile station; a step B of associating, by the master radio base station, the PDCP-PDU and an RLC-SN with each other to transmit the PDCP-PDU and the RLC-SN to the slave radio base station; a step C of generating, by the slave radio base station, an RLC-PDU addressed to the mobile station by using the PDCP-PDU and the RLC-SN; and a step D of transmitting, by the slave radio base station, the RLC-PDU to the mobile station.

A second feature of the present invention is summarized as a radio base station capable of functioning as a master radio base station in a mobile communication system configured such that a mobile station is capable of performing carrier aggregation using a cell under the master radio base station and a cell under a slave radio base station, including: a generation unit configured to generate a PDCP-PDU addressed to the mobile station; and a transmission unit configured to associate the PDCP-PDU addressed to the mobile station and an RLC-SN with each other and transmit the PDCP-PDU and the RLC-SN to the slave radio base station.

A third feature of the present invention is summarized as a radio base station capable of functioning as a slave radio base station in a mobile communication system configured such that a mobile station is capable of performing carrier aggregation using a cell under a master radio base station and a cell under the slave radio base station, including: a reception unit configured to receive a PDCP-PDU addressed to the mobile station and an RLC-SN associated with the PDCP-PDU from the master radio base station; a generation unit configured to generate an RLC-PDU addressed to the mobile station by using the PDCP-PDU and the RLC-SN; and a transmission unit configured to transmit the RLC-PDU to the mobile station.

DETAILED DESCRIPTION

Mobile Communication System According to Embodiment of the Present Invention

A mobile communication system according to an embodiment of the present invention will be explained with reference to FIGS. 1 to 3. The mobile communication system according to this embodiment will be explained by exemplarily illustrating an LTE mobile communication system. However, the present invention is also applicable to other types of mobile communication systems than LTE mobile communication systems.

Figure 1:
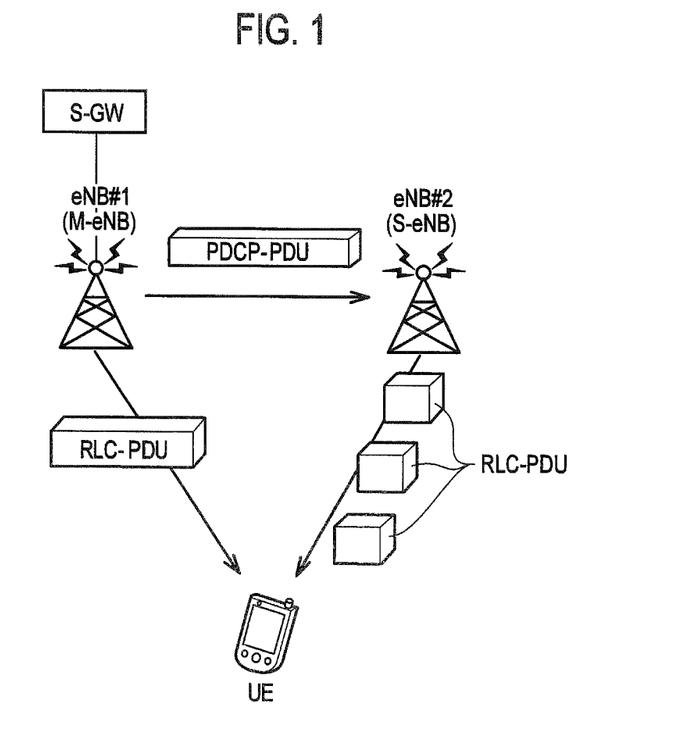
FIG. 1 is an overall configuration diagram of a mobile communication system according to an embodiment of the present invention.

As shown in FIG. 1, the mobile communication system according to this embodiment includes a gateway apparatus S-GW, a radio base station eNB#1, and a radio base station eNB#2.

In the mobile communication system according to this embodiment, the radio base station eNB#1 is a master radio base station M-eNB, and the radio base station eNB#2 is a slave radio base station S-eNB.

Also, in the mobile communication system according to this embodiment, the protocol stack shown in FIG. 6 is used.

Figure 2:
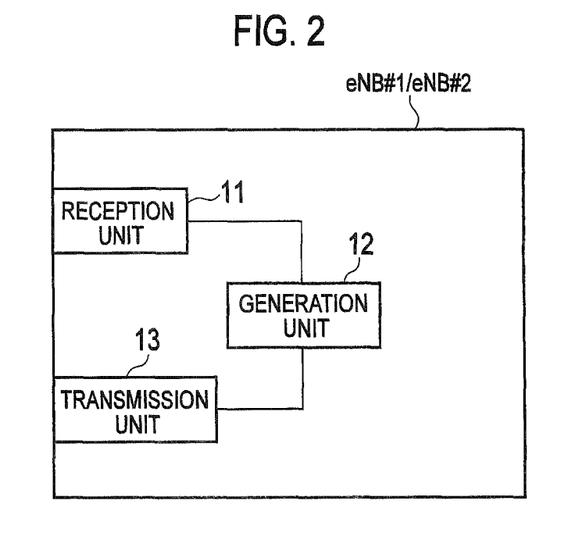
FIG. 2 is a functional block diagram of a radio base station eNB#1/eNB#2 according to the embodiment of the present invention.

As shown in FIG. 2, the radio base station eNB#1/eNB#2 according to this embodiment includes a reception unit 11, a generation unit 12, and a transmission unit 13.

The reception unit 11 of the radio base station eNB#1 is configured to receive various signals from the gateway apparatus S-GW, the radio base station eNB#2, a mobile station UE, and other relevant elements.

For example, the reception unit 11 of the radio base station eNB#1 is configured to receive downlink data signals addressed to the mobile station UE from the gateway apparatus S-GW.

The generation unit 12 of the radio base station eNB#1 is configured to generate PDCP-PDUs with a PDCP layer function based on the downlink data signals addressed to the mobile station UE and received by the reception unit 11.

The generation unit 12 of the radio base station eNB#1 is configured to generate an RLC-PDU with an M-RLC layer function based on a PDCP-PDU generated based on a downlink data signal, among the downlink data signals addressed to the mobile station UE and received by the reception unit 11, which is determined such that it should be transmitted to the mobile station UE without passing through the radio base station eNB#2.

The transmission unit 13 of the radio base station eNB#1 is configured to transmit various signals to the gateway apparatus S-GW, the radio base station eNB#2, the mobile station UE, and other relevant elements.

For example, the transmission unit 13 of the radio base station eNB#1 is configured to transmit the RLC-PDU, which is generated by the generation unit 12, directly to the mobile station UE. The RLC-PDU to be transmitted to the mobile station UE contains an RLC-SN. This RLC-SN has a value other than the value of an RLC-SN which the radio base station eNB#2 is notified of.

Also, the transmission unit 13 of the radio base station eNB#1 is configured to transmit, to the radio base station eNB#2, a PDCP-PDU generated based on a downlink data signal, among the downlink data signals addressed to the mobile station UE and received by the reception unit 11, which is determined such that it should be transmitted to the mobile station UE through the radio base station eNB#2.

Here, the transmission unit 13 of the radio base station eNB#1 is configured to associate this PDCP-PDU and an RLC-SN (Sequence Number) with each other and transmit them to the radio base station eNB#2. The RLC-SN which is associated with this PDCP-PDU generated based on the predetermined downlink data signal and is transmitted to the radio base station eNB#2 corresponds to or is the same as an RLC-SN which will be contained in an RLC-PDU to be generated from this PDCP-PDU and transmitted to the mobile station UE.

The transmission unit 13 of the radio base station eNB#1 may for example be configured to transmit the above-mentioned RLC-SN to the radio base station eNB#2 by using a GTP-U header option.

Also, the transmission unit 13 of the radio base station eNB#1 may be configured to associate the same RLC-SN with a plurality of PDCP-PDUs and transmit them.

The reception unit 11 of the radio base station eNB#2 is configured to receive various signals from the radio base station eNB#1, the mobile station UE, and other relevant elements.

For example, the reception unit 11 of the radio base station eNB#2 is configured to receive a PDCP-PDU and an RLC-SN associated with the PDCP-PDU from the radio base station eNB#1.

The generation unit 12 of the radio base station eNB#2 is configured to generate an RLC-PDU to be transmitted to the mobile station UE with an S-RLC layer function by using the PDCP-PDU and the RLC-SN received by the reception unit 11.

The transmission unit 13 of the radio base station eNB#2 is configured to transmit various signals to the radio base station eNB#1, the mobile station UE, and other relevant elements.

For example, the transmission unit 13 of the radio base station eNB#2 is configured to transmit the RLC-PDU generated by the generation unit 12 to the mobile station UE. Here, the transmission unit 13 of the slave radio base station eNB#2 is configured to re-segment the generated RLC-PDU when necessary.

Note that the transmission unit 13 of the radio base station eNB#2 may be configured to, in a case where the PDCP-PDU received by the reception unit 11 is discarded without being transmitted to the mobile station UE, notify the mobile station UE of that effect (i.e. the failure to transmit the PDCP-PDU to the mobile station UE).

Alternatively, the transmission unit 13 of the radio base station eNB#2 may be configured to, in the case where the PDCP-PDU received by the reception unit 11 is discarded without being transmitted to the mobile station UE, notify the mobile station UE of an RLC-PDU containing only an RLC header and no RLC payload.

The operation of the mobile communication system according to this embodiment, in particular, the operation of the radio base station eNB#1 according to this embodiment will be explained below with reference to FIG. 3.

Figure 3:
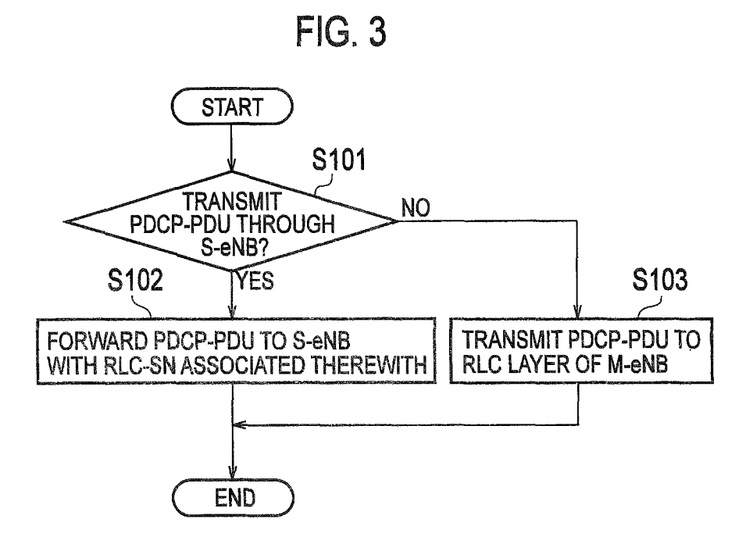
FIG. 3 is a flowchart showing the operation of the radio base station eNB#1 according to the embodiment of the present invention.

As shown in FIG. 3, in Step S101, the radio base station eNB#1 generates PDCP-PDUs with the PDCP layer function based on downlink data signals addressed to the mobile station UE and received from the gateway apparatus S-GW and, for each PDCP-PDU, determines whether or not to transmit the PDCP-PDU to the mobile station UE through the radio base station eNB#2.

If "Yes," this operation proceeds to Step S102. If "No," this operation proceeds to Step S103.

In Step S102, the radio base station eNB#1 associates the PDCP-PDU and an RLC-SN with each other and transmit them to the radio base station eNB#2.

In Step S103, the radio base station eNB#1 generates an RLC-PDU with the M-RLC layer function based on the PDCP-PDU and transmits the RLC-PDU to the mobile station UE.

The features of the present embodiment may also be expressed as follows.

A first feature of the present embodiment is summarized as a mobile communication method for a mobile station UE to perform CA (Carrier Aggregation) using a cell under a radio base station eNB#1 (master radio base station) and a cell under a radio base station eNB#2 (slave radio base station), including: a step A of generating, by the radio base station eNB#1, a PDCP-PDU addressed to the mobile station UE; a step B of associating, by the radio base station eNB#1, the PDCP-PDU and an RLC-SN with each other to transmit the PDCP-PDU and the RLC-SN to the radio base station eNB#2; a step C generating, by the radio base station eNB#2, an RLC-PDU addressed to the mobile station UE by using the PDCP-PDU and the RLC-SN; and a step D of transmitting, by the radio base station eNB#2, the RLC-PDU to the mobile station UE.

According to this feature, the radio base station eNB#1 only needs to be equipped with a buffer for retaining the PDCP-PDU that serves as the base of the RLC-PDU to be transmitted by the radio base station eNB#1 to the mobile station UE, and does not need to be equipped with a buffer for retaining the PDCP-PDU that serves as the base of the RLC-PDU to be transmitted by the radio base station eNB#2. Further, the mobile station UE can process the RLC-PDU which contains a corresponding or the same RLC-SN with one RLC layer function and therefore only needs to be equipped with one RLC layer function for one EPS bearer. In this way, the impact of change in function of the mobile station UE can be reduced.

In the first feature of this embodiment, in the step B, the radio base station eNB#1 may transmit the RLC-SN to the radio base station eNB#2 by using a GTP-U header option.

According to this feature, the radio base station eNB#1 can transmit the RLC-SN to the radio base station eNB#2 by utilizing the existing architecture.

In the first feature of this embodiment, in the step B, the radio base station eNB#1 may associate a plurality of PDCP-PDUs with a same RLC-SN and transmits the PDCP-PDUs and the RLC-SN.

According to this feature, the radio base station eNB#1 can reduce the number of RLC-SNs to be used.

In the first feature of this embodiment, the mobile communication method further may include a step of, in a case where the radio base station eNB#2 discards the PDCP-PDU without transmitting the PDCP-PDU to the mobile station UE, causing the radio base station eNB#2 to notify the mobile station UE that the PDCP-PDU is discarded without being transmitted to the mobile station UE.

According this configuration, the mobile station UE can update the receiving-side RLC window based on the notification and therefore avoid "Tx window stalling."

In the first feature of this embodiment, the mobile communication method further may include a step of, in a case where the radio base station eNB#2 discards the PDCP-PDU without transmitting the PDCP-PDU to the mobile station UE, the radio base station eNB#2 notifies the mobile station UE of an RLC-PDU containing only an RLC header.

According this configuration, the mobile station UE can update the receiving-side RLC window based on the notification and therefore avoid "Tx window stalling."

A second feature of the present embodiment is summarized as a radio base station capable of functioning as a radio base station eNB#1 in a mobile communication system configured such that a mobile station UE is capable of performing CA using a cell under the radio base station eNB#1 and a cell under a radio base station eNB#2, including: a generation unit 12 configured to generate a PDCP-PDU addressed to the mobile station UE; and a transmission unit 13 configured to associate the PDCP-PDU addressed to the mobile station UE and an RLC-SN with each other and transmit the PDCP-PDU and the RLC-SN to the radio base station eNB#2.

According to this feature, the radio base station eNB#1 does not need to be equipped with a buffer for retaining the PDCP-PDU that serves as the base of an RLC-PDU. Further, the mobile station UE only needs to be equipped with one RLC layer function for one EPS bearer, and therefore the impact of change in function of the mobile station UE can be reduced.

In the second feature of this embodiment, the transmission unit 13 may transmit the RLC-SN to the radio base station eNB#2 by using a GTP-U header option.

According to this feature, the radio base station eNB#1 can transmit the RLC-SN to the radio base station eNB#2 by utilizing the existing architecture.

In the second feature of this embodiment, the transmission unit 13 may associate a plurality of PDCP-PDUs with a same RLC-SN and transmits the PDCP-PDUs and the RLC-SN.

According to this feature, the radio base station eNB#1 can reduce the number of RLC-SNs to be used.

A third feature of the present embodiment is summarized as a mobile station system capable of functioning as a radio base station eNB#2 in a mobile communication system configured such that a mobile station UE is capable of performing CA using a cell under a radio base station eNB#1 and a cell under the radio base station eNB#2, including: a reception unit configured to receive a PDCP-PDU addressed to the mobile station UE and an RLC-SN associated with the PDCP-PDU from the radio base station eNB#1; a generation unit 12 configured to generate an RLC-PDU addressed to the mobile station UE by using the PDCP-PDU and the RLC-SN; and a transmission unit 13 configured to transmit the RLC-PDU to the mobile station UE.

According to this feature, the radio base station eNB#1 does not need to be equipped with a buffer for retaining the PDCP-PDU that serves as the base of the RLC-PDU to be transmitted by the radio base station eNB#2. Further, the mobile station UE only needs to be equipped with one RLC layer function for one EPS bearer, and therefore the impact of change in function of the mobile station UE can be reduced.

In the third feature of this embodiment, in a case where the PDCP-PDU is discarded without being transmitted to the mobile station UE, the transmission unit 13 may notify the mobile station UE that the PDCP-PDU is discarded without being transmitted to the mobile station UE.

According this configuration, the mobile station UE can update the receiving-side RLC window based on the notification and therefore avoid "Tx window stalling."

In the third feature of this embodiment, in a case where the PDCP-PDU is discarded without being transmitted to the mobile station UE, the transmission unit 13 may notify the mobile station UE of an RLC-PDU containing only an RLC header.

According this configuration, the mobile station UE can update the receiving-side RLC window based on the notification and therefore avoid "Tx window stalling."

It should be noted that the foregoing operations of the gateway apparatus and the radio base station eNB#1/eNB#2 may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the gateway apparatus and the radio base station eNB#1/eNB#2. Otherwise, the storage medium and the processor may be provided as discrete components inside the gateway apparatus and the radio base station eNB#1/eNB#2. Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-196711 (filed on Sep. 24, 2013) is incorporated herein by reference in the present specification.

INDUSTRIAL APPLICABILITY

As explained above, the present invention can provide a mobile communication method and a radio base station capable of solving the problems with the "distributed RLCs" and the "independent RLCs."

EXPLANATION OF THE REFERENCE NUMERALS

S-GW gateway apparatus
UE mobile station
eNB#1/eNB#2 radio base station
11 reception unit
12 generation unit
13 transmission unit

The invention claimed is:

1. A mobile communication method for a mobile station to perform carrier aggregation using a cell under a master radio base station and a cell under a slave radio base station, comprising:
   a step A of generating, by the master radio base station, a packet data convergence protocol-protocol data unit (PDCP-PDU), addressed to the mobile station;
   a step B of associating, by the master radio base station, the PDCP-PDU and a radio link control-sequence number (RLC-SN) with each other to transmit the PDCP-PDU and the RLC-SN to the slave radio base station;
   a step C of generating, by the slave radio base station, a radio link control-protocol data unit (RLC-PDU) addressed to the mobile station by using the PDCP-PDU and the RLC-SN; and
   a step D of transmitting, by the slave radio base station, the RLC-PDU to the mobile station.

2. The mobile communication method according to claim 1, wherein, in the step B, the master radio base station transmits the RLC-SN to the slave radio base station by using a GTP-U header option.

3. The mobile communication method according to claim 1, wherein, in the step B, the master radio base station associates a plurality of PDCP-PDUs with a same RLC-SN and transmits the PDCP-PDUs and the RLC-SN.

4. The mobile communication method according to claim 1, further comprising a step of, in a case where the slave radio base station discards the PDCP-PDU without transmitting the PDCP-PDU to the mobile station, causing the slave radio base station to notify the mobile station that the PDCP-PDU is discarded without being transmitted to the mobile station.

5. The mobile communication method according to claim 1, further comprising a step of, in a case where the slave radio base station discards the PDCP-PDU without transmitting the PDCP-PDU to the mobile station, the slave radio base station notifies the mobile station of an RLC-PDU containing only an RLC header.

6. A radio base station capable of functioning as a master radio base station in a mobile communication system configured such that a mobile station is capable of performing carrier aggregation using a cell under the master radio base station and a cell under a slave radio base station, comprising:
   a processor that:
      generates a packet data convergence protocol-protocol data unit (PDCP-PDU) addressed to the mobile station; and
      associates the PDCP-PDU addressed to the mobile station and a radio link control-sequence number (RLC-SN) with each other; and
   a transmitter that transmits the PDCP-PDU and the RLC-SN to the slave radio base station.

7. The radio base station according to claim 6, wherein the transmitter transmits the RLC-SN to the slave radio base station by using a GTP-U header option.

8. The radio base station according to claim 6, wherein the processor associate a plurality of PDCP-PDUs with a same RLC-SN and
   the transmitter transmits the PDCP-PDUs and the RLC-SN.

9. A radio base station capable of functioning as a slave radio base station in a mobile communication system configured such that a mobile station is capable of performing carrier aggregation using a cell under a master radio base station and a cell under the slave radio base station, comprising:

a receiver that receives a packet data convergence protocol-protocol data unit (PDCP-PDU) addressed to the mobile station and a radio link control-sequence number (RLC-SN) associated with the PDCP-PDU from the master radio base station;
a processor that generates a radio link control-protocol data unit (RLC-PDU) addressed to the mobile station by using the PDCP-PDU and the RLC-SN; and
a transmitter that transmits the RLC-PDU to the mobile station.

10. The radio base station according to claim 9, wherein, in a case where the PDCP-PDU is discarded without being transmitted to the mobile station, the processor causes the transmitter to notify the mobile station that the PDCP-PDU is discarded without being transmitted to the mobile station.

11. The radio base station according to claim 9, wherein, in a case where the PDCP-PDU is discarded without being transmitted to the mobile station, the processor causes the transmitter to notify the mobile station of an RLC-PDU containing only an RLC header.

12. The mobile communication method according to claim 2, wherein, in the step B, the master radio base station associates a plurality of PDCP-PDUs with a same RLC-SN and transmits the PDCP-PDUs and the RLC-SN.

13. The mobile communication method according to claim 2, further comprising a step of, in a case where the slave radio base station discards the PDCP-PDU without transmitting the PDCP-PDU to the mobile station, causing the slave radio base station to notify the mobile station that the PDCP-PDU is discarded without being transmitted to the mobile station.

14. The mobile communication method according to claim 2, further comprising a step of, in a case where the slave radio base station discards the PDCP-PDU without transmitting the PDCP-PDU to the mobile station, the slave radio base station notifies the mobile station of an RLC-PDU containing only an RLC header.

15. The radio base station according to claim 7, wherein
the processor associate a plurality of PDCP-PDUs with a same RLC-SN and
the transmitter transmits the PDCP-PDUs and the RLC-SN.

* * * * *